United States Patent
Umezawa et al.

(10) Patent No.: US 8,142,916 B2
(45) Date of Patent: Mar. 27, 2012

(54) MAGNETIC RECORDING MEDIUM

(75) Inventors: Teiichiro Umezawa, Singapore (SG);
Masafumi Ishiyama, Singapore (SG);
Kenji Ayama, Singapore (SG);
Tokichiro Sato, Singapore (SG)

(73) Assignee: WD Media (Singapore) Pte, Ltd, Singapore (SG)

( * ) Notice: Subject to any disclaimer, the term of this patent is extended or adjusted under 35 U.S.C. 154(b) by 0 days.

(21) Appl. No.: 12/594,043

(22) PCT Filed: Mar. 28, 2008

(86) PCT No.: PCT/JP2008/056172
§ 371 (c)(1),
(2), (4) Date: Oct. 27, 2009

(87) PCT Pub. No.: WO2008/123446
PCT Pub. Date: Oct. 16, 2008

(65) Prior Publication Data
US 2010/0119878 A1 May 13, 2010

(30) Foreign Application Priority Data
Mar. 30, 2007 (JP) .................. 2007-095750

(51) Int. Cl.
*G11B 5/66* (2006.01)
(52) U.S. Cl. .................. 428/831.2
(58) Field of Classification Search ........... None
See application file for complete search history.

(56) References Cited

U.S. PATENT DOCUMENTS

| 6,638,648 B2 * | 10/2003 | Yamamoto et al. ........... 428/828 |
| 7,604,879 B2 * | 10/2009 | Gouke .......................... 428/831 |
| 2002/0058161 A1 | 5/2002 | Yamamoto et al. |
| 2004/0027868 A1 * | 2/2004 | Nakamura et al. ............ 365/199 |

FOREIGN PATENT DOCUMENTS

| JP | 2002-074648 A | 3/2002 |
| JP | 2002-109720 A | 4/2002 |
| JP | 2002-352408 | 6/2002 |
| JP | 2002-216338 A | 8/2002 |
| JP | 2003-036525 A | 2/2003 |
| JP | 2003-077122 A | 3/2003 |
| JP | 2003-217107 A | 7/2003 |
| JP | 2004-134041 | 4/2004 |
| JP | 2005-044464 A | 2/2005 |
| JP | 2005-251375 A | 9/2005 |
| JP | 2006-155844 | 6/2006 |
| JP | 2006-286103 A | 10/2006 |
| JP | 2007-073136 A | 3/2007 |

OTHER PUBLICATIONS

Written Opinion and Search Report dated Dec. 1, 2010 in Singapore Patent Application No. 200906485-8, 13 pages.
Office Action dated Nov. 15, 2011 in the related Japanese Patent Application No. 2008-088127, 2 pages.

* cited by examiner

*Primary Examiner* — Holly Rickman

(57) ABSTRACT

Provided is a magnetic recording medium which maintains high S/N ratio and coercive force (Hc) and has high recording density, even with fine magnetic particles, by further improving crystal orientation of a magnetic recording layer. The magnetic recording medium is provided with an orientation control layer (16), a nonmagnetic under layer (18), and a magnetic recording layer (22) on a substrate. The orientation control layer (16) has an fcc structure and a (111) plane parallel to the substrate. The under layer (18) has an hcp structure and a (0001) plane parallel to the substrate. An atomic distance of the (111) plane of the orientation control layer (16) is −0.2 Å to +0.15 Å to a lattice spacing of the under layer (18).

11 Claims, 3 Drawing Sheets

MAGNETIC RECORDING MEDIUM

TECHNICAL FIELD

The present invention relates to a magnetic recording medium that is loaded on, for example, an HDD (hard disk drive) of a magnetic recording system.

BACKGROUND

In accordance with the recent increasing storage capacity in information processing, various types of information recording technologies have been developed. In particular, the surface recording density of an HDD (hard disk drive) using a magnetic recording technology has been increasing at an annual rate of about 100%. Recently, 2.5-inch-diameter magnetic disks used in HDDs and the like also have been required to have an information recording capacity of larger than 100 GB per disk. In order to satisfy such a requirement, it is necessary to achieve an information recording density of higher than 150 Gbits per square inch.

In order to achieve a high recording density in a magnetic disk used in an HDD or the like, it has been necessary to reduce the size of crystalline magnetic particles constituting a magnetic recording layer for recording information signals and simultaneously to decrease the thickness of the layer. However, in a case of a magnetic disk of a conventionally commercialized in-plane magnetic recording system (also called a longitudinal magnetic recording system or a horizontal magnetic recording system), as a result of the progress in the size reduction of crystalline magnetic particles, thermal stability of recorded signals is deteriorated by the superparamagnetic phenomenon. This causes a so-called thermal fluctuation phenomenon in which the recorded signals are erased. Thus, the reduction in size of crystalline magnetic particles has been a factor that inhibits an increase in recording density of the magnetic disk. In order to solve the inhibitory factor problem, recently, a magnetic disk of a perpendicular magnetic recording system has been proposed.

In the perpendicular magnetic recording system, the axis of easy magnetization of a magnetic recording layer is adjusted so as to be oriented in the direction perpendicular to a surface of a substrate, unlike the case of the in-plane magnetic recording system. The perpendicular magnetic recording system can suppress the thermal fluctuation phenomenon compared to the in-plane recording system and is therefore suitable for increasing the recoding density.

In the perpendicular magnetic recording system, when the magnetic recording layer has an hcp structure (hexagonal close-packed structure), the axis of easy magnetization is the C-axis direction, and the C-axis is required to be oriented in the normal direction of a substrate. In order to enhance the orientation of the C-axis, as shown in Patent Document 1 (Japanese Unexamined Patent Application Publication No. 2003-77122), it is effective to provide a non-magnetic under layer of an hcp structure below the magnetic recording layer.

Furthermore, in the perpendicular magnetic recording system, the S/N ratio (signal/noise ratio) and the coercivity Hc can be improved by forming the magnetic recording layer so as to have a granular structure in which grain boundaries are formed by segregating a non-magnetic material (mainly an oxide) among magnetic particles (magnetic grains) for isolating the magnetic particles and reducing the size of the magnetic particles. Patent Document 2 (Japanese Unexamined Patent Application Publication No. 2003-217107) discloses a constitution in which a columnar granular structure is formed by allowing epitaxial growth of the magnetic particles.

Furthermore, in the perpendicular magnetic recording system, as described in Patent Document 3 (Japanese Unexamined Patent Application Publication No. 2002-74648), it is preferred to use a so-called two-layer type perpendicular magnetism in which a soft magnetic layer is provided under the magnetic recording layer. With this, the magnetic field intensity (flux density) can be increased by concentrating the flux by forming magnetic circuits among the magnetic head, the magnetic recording layer, and the soft magnetic layer during magnetic recording.

However, there is a problem that the formation of the soft magnetic layer disrupts the orientation and the smoothness of the non-magnetic under layer and affects the perpendicular orientation of the magnetic recording layer. Regarding this problem, Patent Document 4 (Japanese Unexamined Patent Application Publication No. 2005-044464) discloses a configuration composed of a first non-magnetic under layer being amorphous and made of a metal element forming an fcc structure (face-centered cubic crystal structure) by itself alone, a second non-magnetic under layer having an hcp structure, and a perpendicular magnetic recording layer (magnetic recording layer) that are formed so as to be in contact with one another. According to Patent Document 3, by the above-mentioned configuration, the perpendicular orientation of the perpendicular magnetic recording layer can be strictly controlled.

[Patent Document 1] JP-A-2003-77122
[Patent Document 2] JP-A-2002-74648
[Patent Document 3] JP-A-2002-74648
[Patent Document 4] JP-A-2005-044464

DISCLOSURE OF THE INVENTION

Problems to be Solved by the Invention

Incidentally, recently, the information recording surface density of the magnetic disk is required to be further increased in the recording density. In order to realize a perpendicular magnetic recording medium that can satisfactorily conduct information recording and reproducing in such a high recording density, the perpendicular orientation of the axis of easy magnetization of the recording layer is required to be further strictly controlled for ensuring predetermined S/N ratio and resolution.

That is, as described above, the reduction in size of magnetic particles is effective for increasing the recording density. However, an excessive reduction in the size of magnetic particles causes an excessive reduction in the number of atoms constituting the magnetic particles, which raises a problem of a thermal fluctuation phenomenon, as in the in-plane magnetic recording medium. In order to avoid the problem of thermal fluctuation, the following methods have been previously employed. One is a method in which the coercivity of a medium is enhanced by increasing the anisotropy constant (Ku) by optimizing the composition of the magnetic recording layer. Another is a method in which the coercivity is enhanced by improving the crystalline orientation of the magnetic recording layer by optimizing the material of a seed layer, the material of an under layer, or the film configuration thereof.

Accordingly, it is an object of the present invention to provide a magnetic recording medium that can maintain a high S/N ratio and high coercivity Hc even if the size of magnetic particles is reduced and can increase the recording density by further enhancing the crystalline orientation of the magnetic recording layer.

Means for Solving the Problems

The present inventors have conducted intensive investigation for solving the above-mentioned problems and have focused on that in order to enhance the crystalline orientation of a magnetic recording layer having an hcp structure, a non-magnetic under layer having an hcp structure, which functions as a base of the growth of the magnetic recording layer, is important and that the crystalline condition of the non-magnetic under layer is highly affected by an orientation control layer functioning as a base of the non-magnetic under layer. Furthermore, it has been found that the affection greatly depends on the relationship between the lattice spacing (distance between nearest-neighbor atoms, that is, lattice constant) of the non-magnetic under layer and the atomic distance (distance between nearest-neighbor atoms) of the (111) plane of the orientation control layer, and by conducting further research, the present invention has been accomplished.

Specifically, according to a typical configuration of a magnetic recording medium of the present invention, there is provided a magnetic recording medium comprising an orientation control layer, a non-magnetic under layer, a magnetic recording layer on a substrate, wherein the orientation control layer has an fcc structure and a (111) plane being parallel to the substrate;

the under layer has an hcp structure and a (0001) plane being parallel to the substrate;

the magnetic recording layer has an hcp structure and a (0001) plane being parallel to the substrate; and a difference of the distance between nearest-neighbor atoms of the orientation control layer from the distance between nearest-neighbor atoms on a (0001) plane of the under layer is from −0.2 Å to +0.15 Å.

According to the above-described configuration, the crystalline orientation of the under layer and the magnetic recording layer can be enhanced, the coercivity Hc and the S/N ratio can be enhanced, and the recording density can be increased. In addition, an increase in the difference between the atomic distance b and the lattice spacing deteriorates the crystalline orientation of the magnetic layer to reduce the coercivity Hc and the reproduction output, and therefore the above-mentioned range was determined. Furthermore, since the crystalline orientation is deteriorated, lattice defects of the magnetic layer are increased. Therefore, noise is increased to deteriorate the S/N ratio. That is, a level exceeding the upper limit or the lower limit of the above-mentioned range causes reductions in the coercivity Hc and the S/N ratio.

The under layer can be selected from Ru (ruthenium), RuCr (ruthenium-chromium alloy), and RuCo (ruthenium-cobalt alloy). Ru forms an hcp structure and can satisfactorily orient the magnetic recording layer whose main component is Co (cobalt).

The orientation control layer can be selected from Ni (nickel), Cu (copper), Pt (platinum), and Pd (palladium) and also may be an alloy composed of any of these metals as a main component and one or more addition elements selected from Ti (titanium), V (vanadium), Ta (tantalum), Cr, Mo (molybdenum), and W (tungsten). The concentration of the addition element can be 3 to 20 at % (atomic %). The atomic distance can be controlled by the type and the concentration of the addition element.

In particular, the orientation control layer is preferably an alloy including a main component of Ni and 5 to 20 at % one or more addition elements selected from Ti, V, Ta, Cr, Mo, and W. The atomic distance of the (111) plane of a Ni crystal resembles to the length of the a-axis of Co, and the condition of a Ru crystal affected by Ni can enhance the crystalline orientation of Co. The concentration is determined to be 5 to 20 at % because a concentration less than 5% allows Ni to exhibit its intrinsic characteristics as a ferromagnetic material, and a concentration of greater than 20 at % does not allow Ni to maintain the crystal structure and makes it amorphous.

The magnetic recording layer is preferably a ferromagnetic layer of a granular structure formed by segregating a non-magnetic material among magnetic particles containing at least Co. This is because a magnetic layer having a granular structure shows relatively fine S/N characteristics. The granular structure can obtain satisfactory characteristics at low substrate temperature because of its characteristics. Usually, a film formed at low substrate temperature tends to deteriorate its crystalline properties. Therefore, the crystalline orientation of a film having a granular structure tends to be affected by the under layer. Accordingly, the control of crystalline orientation is more important than a longitudinal medium.

Advantages

According to the present invention, the crystalline orientation of a magnetic recording layer can be enhanced by setting an optimum range regarding the relationship between the lattice spacing of a non-magnetic under layer with respect to the magnetic recording layer and the atomic distance of an orientation control layer lying under the non-magnetic under layer. Therefore, the thermal fluctuation can be prevented by enhancing the coercivity Hc, and the S/N ratio can be enhanced by reducing noise. Thus, a further increase in recording density is possible.

Figure 1:
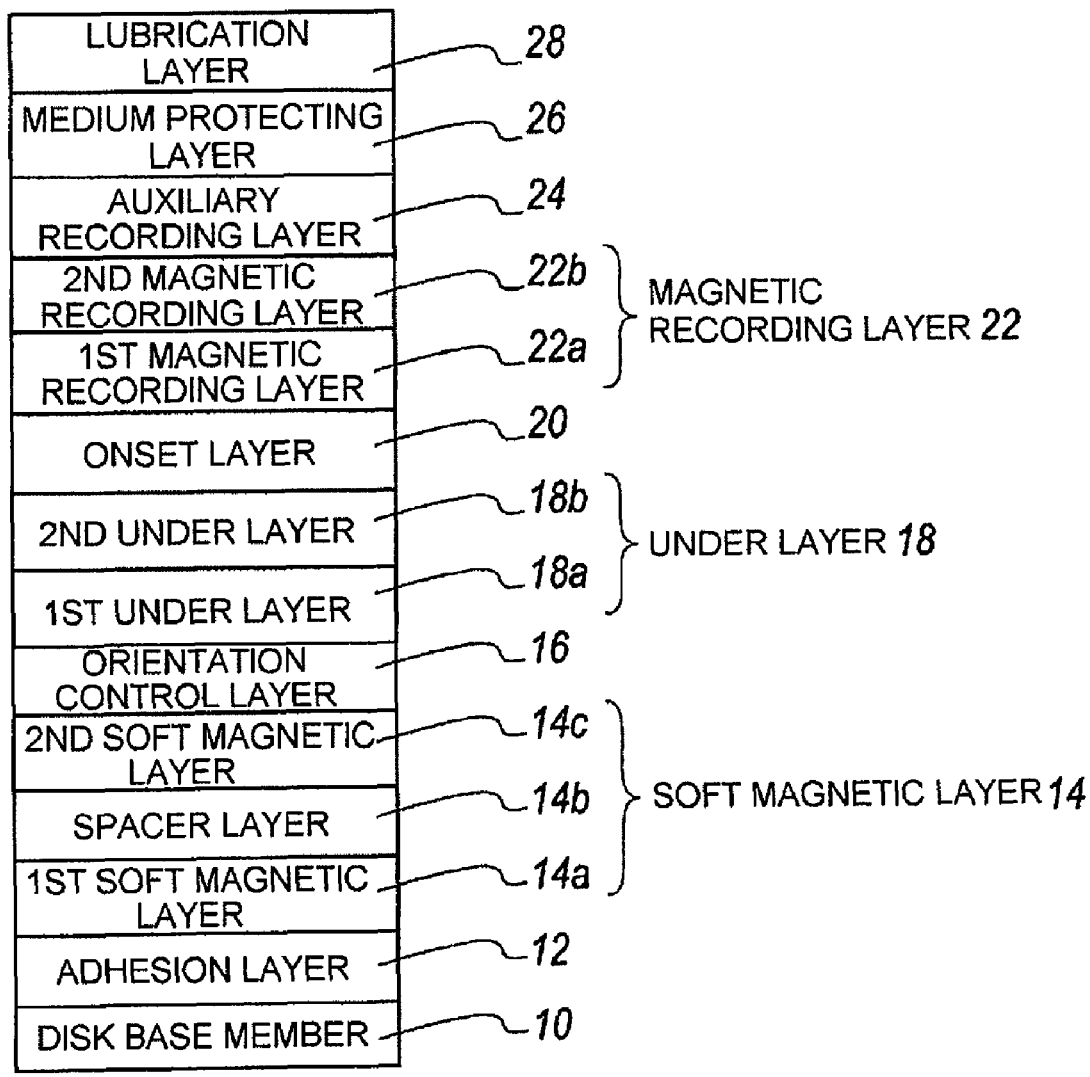
FIG. 1 is a diagram illustrating a structure of a magnetic recording medium according to an embodiment.

REFERENCE NUMERALS 10 disk substrate
12 adhesion layer
14 soft magnetic layer
14a first soft magnetic layer
14b spacer layer
14c second soft magnetic layer
16 orientation control layer
18 under layer
18a first under layer
18b second under layer
20 onset layer
22 magnetic recording layer
22a first magnetic recording layer
22b second magnetic recording layer
24 capped layer
26 medium-protecting layer
28 lubrication layer

BEST MODES FOR CARRYING OUT THE INVENTION

An embodiment of the magnetic recording medium according to the present invention will be described. FIG. 1 is a diagram illustrating a structure of the magnetic recording medium according to the embodiment, FIG. 2 includes diagrams illustrating an fcc structure and an hcp structure of crystals, and FIG. 3 includes diagrams illustrating examples and comparative examples.

Incidentally, the sizes, materials, and other specific numeric values shown in the following embodiments are only examples provided for better understanding of the invention, and the present invention is not limited thereto unless otherwise specifically indicated.

The magnetic recording medium shown in FIG. 1 is a perpendicular magnetic recording medium that is configured of a disk substrate 10, an adhesion layer 12, a first soft magnetic layer 14a, a spacer layer 14b, a second soft magnetic layer 14c, an orientation control layer 16, a first under layer 18a, a second under layer 18b, an onset layer 20, a first magnetic recording layer 22a, a second magnetic recording layer 22b, a capped layer or an auxiliary recording layer 24, a medium-protecting layer 26, and a lubrication layer 28. The first soft magnetic layer 14, the spacer layer 14b, and the second soft magnetic layer 14c collectively constitute a soft magnetic layer 14. The first under layer 18a and the second under layer 18b collectively constitute an under layer 18. The first magnetic recording layer 22a and the second magnetic recording layer 22b collectively constitute a magnetic recording layer 22.

First, amorphous aluminosilicate glass was formed into a disk-like shape by direct press to produce a glass disk. The glass disk was successively subjected to grinding, polishing, and chemical strengthening to obtain a smooth non-magnetic disk substrate 10 made of a chemically strengthened glass disk.

On the resulting disk substrate 10, from the adhesion layer 12 to the capped layer 24 were successively formed by a DC magnetron sputtering process in an Ar atmosphere using a vacuumed film-forming apparatus, and the medium-protecting layer 26 was formed by a CVD method. Then, the lubrication layer 28 was formed by a dip-coating method. In addition, from the standpoint of high productivity, it is also preferred to use an in-line type film forming method. The configuration of each layer and a production process thereof will be described below.

The adhesion layer 12 is an amorphous under layer and is formed so as to be in contact with the disk substrate 10. The adhesion layer 12 has a function of enhancing peeling resistance between the soft magnetic layer 14 and the disk substrate 10 formed thereon and a function of reducing and homogenizing the size of crystalline grains of each layer formed thereon. When the disk substrate 10 is made of amorphous glass, the adhesion layer 12 is preferably an amorphous alloy film for conforming to the amorphous glass surface.

The adhesion layer 12 can be selected from, for example, a CrTi-based amorphous layer, a CoW-based amorphous layer, a CrW-based amorphous layer, a CrTa-based amorphous layer, and a CrNb-based amorphous layer. Among them, the CoW-based amorphous layer forms an amorphous metal film containing microcrystals and is therefore particularly preferred. The adhesion layer 12 may be a single layer made of a single material or may be formed by laminating a plurality of layers. For example, a CoW layer or a CrW layer may be formed on a CrTi layer. In addition, it is preferable that the adhesion layer 12 be subjected to sputtering with a material containing carbon dioxide, carbon monoxide, nitrogen, or oxygen or that the surface layer thereof be exposed to any of these gases.

In the embodiment, a Ti-alloy layer of a 10 nm was formed using a CrTi-alloy target as the adhesion layer 12. From a practical viewpoint, the thickness of the adhesion layer is preferably set to 1 to 50 nm.

The soft magnetic layer 14 was configured so as to have an AFC (antiferromagnetic exchange coupling) by disposing a non-magnetic spacer layer 14b between the first soft magnetic layer 14a and the second soft magnetic layer 14c. By doing so, the magnetization direction of the soft magnetic layer 14 can be arranged along the magnetic path (magnetic circuit) with high precision, and the vertical component in the magnetization direction is significantly decreased, which can reduce the noise generated by the soft magnetic layer 14. As the compositions of the first soft magnetic layer 14a and the second soft magnetic layer 14c, cobalt-based alloys such as CoTaZr, Co—Fe-based alloys such as CoCrFeB and FeCoTaZr, and Ni—Fe-based alloys such as [Ni—Fe/Sn]n multilayer structures can be used. In the embodiment, the compositions of the first soft magnetic layer 14a and the second soft magnetic layer 14c were each CoCrFeB, and the composition of the spacer layer 14b was Ru (ruthenium).

The orientation control layer 16 has an effect of protecting the soft magnetic layer 14, an effect of enhancing the orientation arrangement of crystalline particles of the under layer 18, and a function of orienting the axis of easy magnetization of a hexagonal close-packed structure (hcp structure) contained in the under layer 18, which is formed on the orientation layer 16, in the direction perpendicular to the disk. The orientation control layer 16 has an fcc structure, such as that shown in FIG. 2(a), wherein the (111) plane is parallel to the disk substrate 10.

The under layer 18 is required to have an hcp structure, such as that shown in FIG. 2(b), wherein the (0001) plane is parallel to the substrate. By doing so, the c-axis of the hcp structure of the magnetic recording layer 22 can be perpendicularly oriented with respect to the substrate. Therefore, a higher crystalline orientation of the under layer 18 can enhance the orientation of the magnetic recording layer 22.

In the embodiment, the under layer 18 has a two-layer structure made of Ru. The Ar gas pressure when the second under layer 18b on the upper layer side is formed is set to be higher than that for forming the first under layer 18a on the lower layer side. The increase in the gas pressure shortens the mean free path of sputtered plasma ions. Consequently, the deposition rate is reduced, and thereby the crystalline orientation is enhanced. In addition, the size of crystal lattice is reduced by increasing the pressure. Since the size of a Ru crystal lattice is larger than that of a Co crystal lattice, the crystalline orientation of the granular layer of Co can be further enhanced by reducing the crystal lattice of Ru close to that of Co. The material of the under layer can be selected from RuCr and RuCo, in addition to Ru. Ru forms an hcp structure and can satisfactorily orient the magnetic recording layer whose main component is Co.

Figure 2:
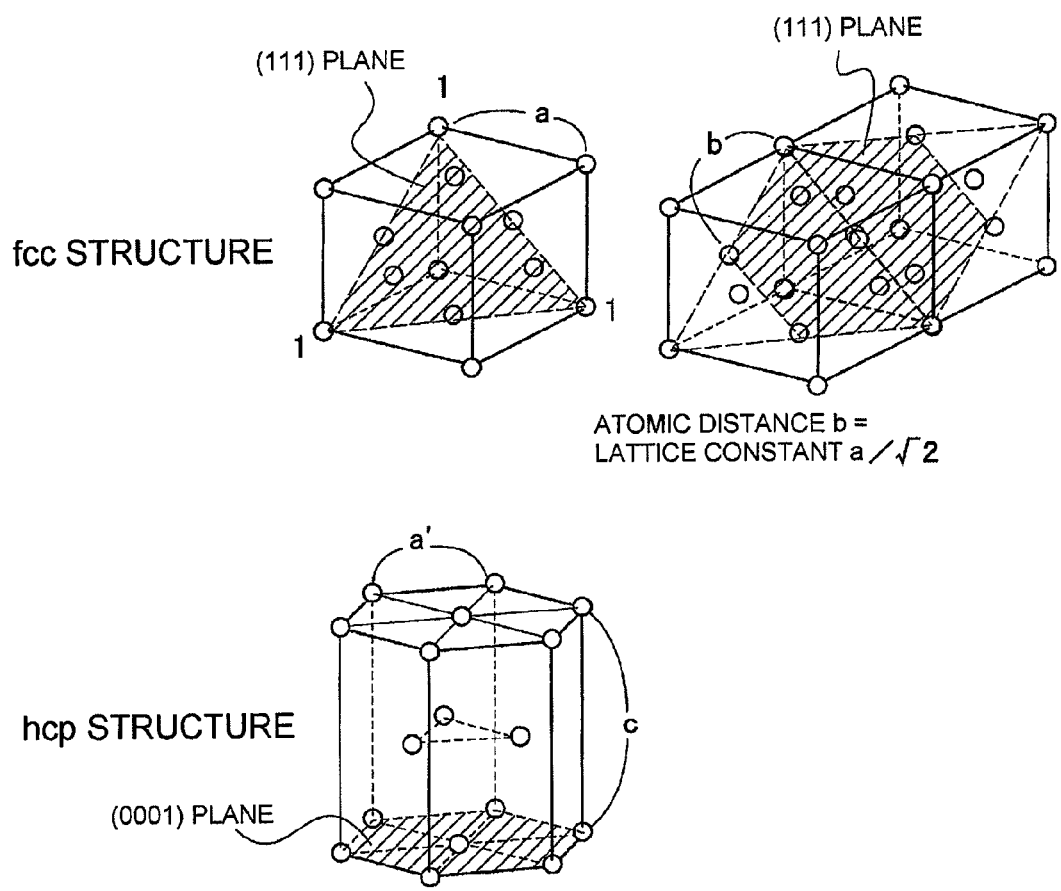
FIG. 2 includes diagrams illustrating an fcc structure and an hcp structure of crystals.

The cooperation of the fcc structure and the hcp structure will now be described with reference to FIG. 2. As shown in FIG. 2(a), in the fcc structure (face-centered cubic crystal structure), the crystal unit can be recognized as a cube, but various planes can be observed by varying crystal planes to be cut. Since the distance between atoms varies by varying the cut plane, it is necessary to consider which plane is exposed to the interface with the Ru layer. Then, a film formation by sputtering forms a (111) plane, which is a close-packed plane, in parallel to the surface of the disk substrate 10. In this case, a hexagonal shape can be observed in the atomic arrangement, and the atoms face the atoms in the (0001) plane of the hcp crystal of the under layer 18.

That is, when the surface of the orientation control layer 16 is the (111) plane of the fcc structure, the crystals of the hcp structure of the under layer can be suitably oriented, and the c-axis can be arranged in the normal direction to the disk substrate 10. Therefore, the granular structure of the magnetic recording layer 22 is also enhanced in the crystalline orientation to accelerate the isolation and reduction in size. In addition, in order to make the (111) plane parallel to the disk substrate 10, it is preferable that the adhesion layer 12 as the lower layer be amorphous not having a crystal structure.

Usually, the lattice spacing a (lattice constant) in an fcc structure means the side length of a cube, and the atomic distance b, which is the distance between nearest-neighbor atoms of the (111) plane of the orientation control layer 16, is $1/\sqrt{2}$ times the lattice spacing a. It is believed that even if a difference is generated between the atomic distance b of the (111) plane of the orientation control layer 16 and the lattice spacing a' as the distance between nearest-neighbor atoms of the hcp structure, when the difference is within a certain range, each other's crystal lattices do not gradually increase the misalignment thereof, but match with each other due to the fluctuation of the lattice spacing. That is, in the embodiment, the lattice spacing a' of Ru of the under layer, which is formed later, is affected by the atomic distance b of the (111) plane of the orientation control layer 16 and is thereby enlarged or contracted.

In addition, when the difference of the atomic distance b of the (111) plane of the orientation control layer 16 from the lattice spacing a' of the under layer 18 is in the range of −0.2 to +0.15 Å, the crystalline orientation of the under layer 18 and the magnetic recording layer 22 can be enhanced. This is because Hc tends to decrease when the atomic distance b is smaller than the lattice spacing a' of the under layer by −0.2 Å or more, and the S/N ratio decreases when the atomic distance b is larger than the lattice spacing a' of the under layer by +0.15 Å or more.

The material of the orientation control layer can be selected from Ni, Cu, Pt, and Pd. In addition, Zr, Hf, or Nb can be similarly selected. This is because the crystals of these metals have fcc structures, and the difference between the atomic distance of the (111) plane of each crystal and the lattice spacing of Ru is small and is within a certain range. Furthermore, the material may be an alloy including a main component of any of these metals and one or more addition elements selected from Ti, V, Ta, Cr, Mo, and W. The concentration of the addition element can be 3 to 20 at % (atomic %). The atomic distance can be controlled by the type and the concentration of the addition element.

In particular, the orientation control layer is preferably an alloy including a main component of Ni and 3 to 20 at % one or more addition elements selected from Ti, V, Ta, Cr, Mo, and W. The atomic distance of the (111) plane of a Ni crystal resembles to the length of the a-axis of Co, and the condition of a Ru crystal affected by Ni can enhance the crystalline orientation of Co. The concentration is determined to be 3 to 20 at % because a concentration less than 3% allows Ni to exhibit its intrinsic characteristics as a ferromagnetic material and become a noise source, and a concentration of greater than 20 at % cannot allow Ni to maintain the crystal structure and makes Ni amorphous.

Incidentally, the lattice spacing a of the orientation control layer can be controlled by applying a bias voltage to the disk when the layer is formed by sputtering. For example, in the case of Pd or NiCr10, the lattice spacing a can be increased by 0.02 Å by applying a bias of 400 V.

In addition, the material of the under layer can be selected from RuCr and RuCo, in addition to Ru. Ru forms an hcp structure and can satisfactorily orient the magnetic recording layer whose main component is Co.

The onset layer 20 is a non-magnetic granular layer. The non-magnetic granular layer is formed on an hcp crystal structure of the under layer 18, and then a granular layer as the first magnetic recording layer 22a is made to grow on the non-magnetic granular layer. This has an effect of allowing the magnetic granular layer to be isolated, from the beginning stage of growing (start-up). The composition of the onset layer 20 can be a granular structure containing a non-magnetic material among crystalline particles made of a Co-based alloy. In particular, CoCr—$SiO_2$ and CoCrRu—$SiO_2$ can be suitably used. In addition, Rh (rhodium), Pd (palladium), Ag (silver), Os (osmium), Ir (iridium), and Au (gold) can be used instead of Ru. In the embodiment, the composition of the onset layer 20 was non-magnetic CoCr—$SiO_2$.

The magnetic recording layer 22 is configured of a first magnetic recording layer 22a having a small thickness and a second magnetic recording layer 22b having a large thickness. Both the first magnetic recording layer 22a and the second magnetic recording layer 22b have a columnar granular structure formed by segregating a non-magnetic material at the surroundings of a hard magnetic material selected from Co-based alloys, Fe-based alloys, and Ni-based alloys. As the non-magnetic material, oxides such as $SiO_2$, $Cr_2O_3$, $TiO_2$, $B_2O_3$, and $Fe_2O_3$, nitrides such as BN, and carbides such as $B_4C_3$ can be suitably used. In addition, a composite of two or more non-magnetic materials can be used.

The first magnetic recording layer 22a was formed so as to have a 2 nm CoCrPt—$Cr_2O_3$ hcp crystal structure using a hard magnetic target composed of CoCrPt containing chromium oxide ($Cr_2O_3$) as an example of the non-magnetic material. The non-magnetic material was segregated at the surroundings of a magnetic material to form grain boundaries, and the magnetic particles (magnetic grains) formed a columnar granular structure. The magnetic particles epitaxially grew continuously from the granular structure of the onset layer 20.

The second magnetic recording layer 22b was formed so as to have a 10 nm CoCrPt—$TiO_2$ hcp crystal structure using a hard magnetic target composed of CoCrPt containing titanium oxide ($TiO_2$) as an example of the non-magnetic material. In also the second magnetic recording layer 22b, the magnetic particles formed a granular structure.

The capped layer 24 is a magnetically continuing layer (also called continuous layer) in the in-plane direction formed on the granular magnetic layer and shows a strong perpendicular magnetic anisotropy. With this layer, in addition to the high-density recording properties and the low-noise properties of the granular layer, the reverse magnetic domain nucleation field Hn is enhanced, the thermal fluctuation resistance characteristics are improved, and the overwrite characteristics are improved. In the embodiment, the composition of the capped layer 24 was CoCrPtB.

Furthermore, the capped layer 24 may not be a single layer and may have a CGC (coupled granular continuous) structure that forms a thin film (continuous layer) showing a strong perpendicular magnetic anisotropy and high saturation magnetization Ms. The CGC structure can be configured of a magnetic recording layer having a granular structure, a coupling control layer of a thin film made of a non-magnetic material such as Pd or Pt, and an exchange energy control layer made of an alternately-laminated film in which a CoB thin film and a Pd thin film are laminated.

The medium-protecting layer 26 was formed from carbon by a CVD method while vacuum is maintained. The medium-protecting layer 26 is protection layer for protecting the perpendicular magnetic recording layer from impact of the magnetic head. In general, since the film hardness of a carbon film formed by the CVD method is enhanced compared to a film formed by a sputtering method, the perpendicular magnetic recording layer can be more effectively protected from impact from the magnetic head.

The lubrication layer 28 was formed by dip-coating PFPE (perfluoro polyether). The thickness of the lubrication layer 28 is about 1 nm.

According to the production process above, a perpendicular magnetic recording medium was obtained. The effectiveness of the present invention will be described by referring to examples and comparative examples below.

As shown in FIG. 3(a), coercivity Hc and S/N ratio were measured by varying the composition of the orientation control layer. In Examples 1 to 8, NiW5, NiW10, NiCr10, NiCr10 (400 V bias voltage application), Pd, Pd (400 V bias voltage application), Pt, and NiAg5 were used, and in Comparative Examples 1 and 2, Ni and Ag were used. The crystal structure, the lattice spacing a of the fcc structure, the lattice spacing a' of the hcp structure, and atomic distance b of the (111) plane of each material are shown in the diagram. FIG. 3(b) is a graph showing a relationship of the coercivity Hc and S/N ratio with respect to the difference between the atomic distance of the orientation control layer made of each composition and the lattice spacing a' (2.70 Å) of Ru of the under layer.

Here, the value of coercivity Hc that is required varies according to the recording density of the magnetic recording medium. That is, a higher coercivity Hc is required in accordance with a reduction in the size of magnetic particles (magnetic grains) due to an increase in the recording density. However, in a case in which a high recording density is not required, contrarily, a suppressed coercivity Hc can enhance the overwrite characteristics. Specifically, when the coercivity Hc is 3500 [Oe] (oersted) or higher, the coercivity Hc is determined by balance with recording density. On the other hand, a higher S/N ratio is preferred regardless of the recording density and other factors. Specifically, an S/N ratio of 19 dB or more is preferred.

Figure 3:
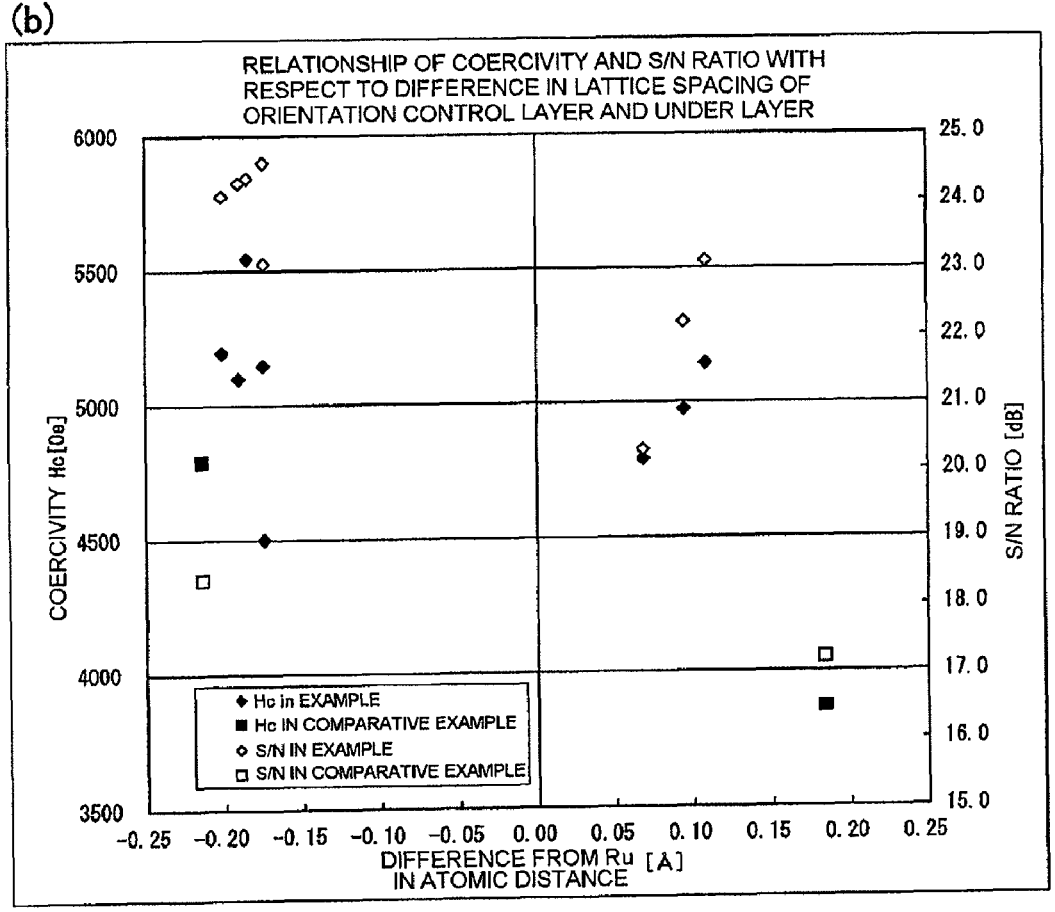
FIG. 3 includes diagrams illustrating examples and comparative examples.

As shown in FIG. 3, when the difference of the atomic distance b of the (111) plane of the orientation control layer 16 from the lattice spacing a' (2.70 Å) of Ru is −0.2 Å or less, the S/N ratio sharply decreases. Also when the difference of the atomic distance b from the lattice spacing a' is 0.15 Å or more, similarly, the coercivity Hc and the S/N ratio sharply decrease. These reveal that Hc and S/N are enhanced when the difference of the atomic distance b of the orientation control layer 16 from the lattice spacing a' of Ru is within the range of −0.2 to +0.15 Å.

The mechanism of exhibiting above-described characteristics is not clear, but it can be assumed that hcp crystals of Ru easily grow by controlling the difference between the atomic distance b of the orientation control layer and the lattice spacing a' of Ru within a certain range to enhance the crystalline orientation, resulting in increases in the coercivity Hc and the S/N ratio.

As in above, the preferred examples of the present invention have been described referring to the accompanied drawings, but it is obvious that the present invention is not limited to such examples. It is evident that those skilled in the art can arrive at various alterations and modifications within the scope described in Claims, and it is understood that those alterations and modifications surely belong to the technical scope of the present invention.

INDUSTRIAL APPLICABILITY

The present invention can be used in a magnetic recording medium that is loaded on, for example, an HDD (hard disk drive) of a magnetic recording system.

The invention claimed is:

1. A perpendicular magnetic recording medium with recording density higher than 150 Gbits per square inch, comprising:
   an orientation control layer, a non-magnetic under layer, a magnetic recording layer on a substrate, wherein
   the orientation control layer has an fcc structure and a (111) plane being parallel to the substrate;
   the under layer comprises two layers, said layers differing in crystalline characteristics, and has an hcp structure and a (0001) plane being parallel to the substrate;
   the magnetic recording layer has an hcp structure and a (0001) plane being parallel to the substrate; and
   a difference of the distance between nearest-neighbor atoms of the orientation control layer from the distance between nearest-neighbor atoms on a (0001) plane of the under layer is from −0.2 Å to +0.15 Å,
   wherein the orientation control layer is made of an alloy including Ni as a main component and 5 to 20 at % of one or more of Ti, V, Ta, Cr, Mo, and W as an addition element.

2. The magnetic recording medium according to claim 1, wherein the under layer is selected from Ru, RuCr, and RuCo.

3. The magnetic recording medium according to claim 1, wherein the magnetic recording layer is a ferromagnetic layer of a granular structure formed by segregating a non-magnetic material among magnetic particles containing at least Co.

4. The magnetic recording medium according to claim 1, wherein the recording layer comprises two layers that differ in thickness.

5. The magnetic recording medium according to claim 4, wherein the thickness of a larger layer is more than double a thickness of a smaller layer.

6. The magnetic recording medium according to claim 1, wherein the atomic distance on the (111) plane is in the range of 2.51 and 2.53 inclusive.

7. The magnetic recording medium according to claim 1, wherein the difference is in the range between −0.20 and −0.17 inclusive.

8. The magnetic recording medium according to claim 4, wherein the two layers comprise a larger layer and a smaller layer and a thickness of the larger layer is substantially more than a thickness of the smaller layer.

9. The magnetic recording medium according to claim 4, wherein the larger layer and the smaller layer comprise different materials.

10. The magnetic recording medium according to claim 1, wherein, said two layers differ in crystal lattice size.

11. The magnetic recording medium according to claim 4, wherein the larger layer is located between the smaller layer and the underlayer.

* * * * *